United States Patent [19]
Tillner

[11] Patent Number: 5,641,552
[45] Date of Patent: Jun. 24, 1997

[54] ANCHORING STRIP FOR A PULL-IN ROD FOR SHAPING THE PROFILE OF UPHOLSTERY MATERIAL

[76] Inventor: Alfred Tillner, Richtstaettenweg 1A 49191, Belm, Germany

[21] Appl. No.: 264,384

[22] Filed: Jun. 23, 1994

[30]     Foreign Application Priority Data

Oct. 21, 1993 [DE] Germany ................. 9316093 U

[51] Int. Cl.$^6$ .................................................. B32B 3/06
[52] U.S. Cl. ................. 428/102; 297/452.13; 297/452.6; 297/452.61; 428/192; 428/223; 428/306.6; 428/309.9
[58] Field of Search .............. 29/91.7; 297/452.61, 297/452.13, 452.6; 428/83, 99, 100, 192, 304.4, 309.9, 306.6, 223, 246, 102

[56]         References Cited

U.S. PATENT DOCUMENTS 3,586,370  6/1971  Barecki et al. ................. 297/219
3,853,352  12/1974  Ambrose ......................... 297/452
3,988,034  10/1976  Fister, Jr. ....................... 297/458
5,171,395  12/1992  Gilcreast ........................ 428/100 X Primary Examiner—Marion E. McCamish
Assistant Examiner—Blaine R. Copenheaver
Attorney, Agent, or Firm—Jordan and Hamburg

[57]          ABSTRACT

An anchoring strip for a pull-in rod is used for shaping the profile of upholstery materials for upholstered parts, which are covered on their outside by a covering material. For this purpose, an anchoring strip has a sewing-on flag, which can be connected with the covering material. The anchoring strip consists of a molded plastic body which is formed in one piece and has a basic connector bar, which can be anchored flexibly to the upholstery material. Along the longitudinal extent of the basic connector bar, receiving elements for a pull-in rod are provided and which are disposed at intervals from one another and point to the outside of the upholstered part. The pull-in rod can be interlocked from the outside of the upholstered part with the receiving elements to form a firm holding engagement.

13 Claims, 2 Drawing Sheets

ANCHORING STRIP FOR A PULL-IN ROD FOR SHAPING THE PROFILE OF UPHOLSTERY MATERIAL

BACKGROUND OF THE INVENTION

The invention relates to an anchoring strip for a pull-in rod for shaping the profile of foam upholstery materials, covered on their outside by a covering material and used for upholstered furniture and similar upholstered parts, such as the seat parts and/or the back parts, the pull-in rod bearing along a longitudinal edge a sewing on flag that can be connected with the covering material.

Pull-in rods for shaping profiles are used for upholstered furniture, but also for other upholstered parts such as seat parts and/or back parts, particularly of automobile seats for the purpose of bringing the foam upholstery material, attached to a suitable backing, into the desired shape suitable for seats. To accomplish this, the covering material is sewn to the sewing-on flag of the pull-in rod and the pull-in rod, so prepared, is then pulled in essentially transversely to the outer surface of the covering material resting upon the upholstery material and into the upholstery material through a slit in the material and fixed, as a result of which a seam-like so-called blind tacking with appropriate profile archings on either side of the blind tacking is achieved.

Metal wires or rods, which extend through the upholstery material, are usually used to fix the pull-in rod in the upholstery material. Such metal wires or rods are expensive in themselves and expensive to install and the material-related disposal of used seat parts and back parts, for which the metal parts on the one hand and the foam material, such as polyurethane foam, formed from a suitable synthetic resin, on the other, must be disposed of differently, proves to be disadvantageous, since it is difficult to remove the metal wires or rods from the foam material with an effort justifiable from an economics point of view.

SUMMARY OF THE INVENTION

It is an object of the invention to provide an anchoring strip for a pull-in rod of the type described above, which makes it unnecessary to use metal parts in the upholstery material for fixing the pull-in rod in the upholstery material and does not create disposal difficulties.

Pursuant to the invention, this objective is accomplished owing to the fact that the anchoring strip consists of a molded plastic body, which is formed in one piece and has a basic connector bar, which can be anchored to the upholstery material and is provided along its longitudinal extent with receiving elements for the pull-in rod, which are disposed spaced apart from one another and point to the outside of the upholstered part and with which the pull-in rod can be interlocked from the outside of the upholstered part with the development of a firm holding engagement. With this embodiment, the anchoring strip, with its receiving elements, ensures that the pull-in rod, pulled in with the covering material over the sewing-on flag, is fixed securely. On the other hand, since it consists of a molded plastic body, an appropriately equipped upholstery part does not require, in the event of disposal, any expensive separation of the materials of the upholstered part for the material-specific disposal of such an upholstered part. The anchoring strip, together with the pull-in rod, thus forms an inventive apparatus of plastic for shaping the profile of foam upholstery materials covered on the outside by a covering material, which can be processed easily, offers a secure hold for the pulled-in covering material and can be disposed of jointly with the foam material forming the upholstery material. Further distinguishing features and advantages of the invention arise out of the claims and the specification below in conjunction with the drawing, in which an embodiment of the invention is illustrated diagrammatically.

IN THE DRAWINGS

FIG. 1 shows a view of an automobile seat with an inserted anchoring strip before the covering material is pulled in by means of the pull-in rod, FIG. 2 shows a side view of an anchoring strip with a pull-in rod with sew-on flag, interlocked with the anchoring strip with the development of a holding engagement, and FIG. 3 shows a cross section through the profile-forming apparatus of FIG. 2, formed by the anchoring strip and the pull-in rod, in the state in which it is anchored with the upholstery material and with the covering material pulled in.

DESCRIPTION OF THE PREFERRED EMBODIMENTS

Figure 1:
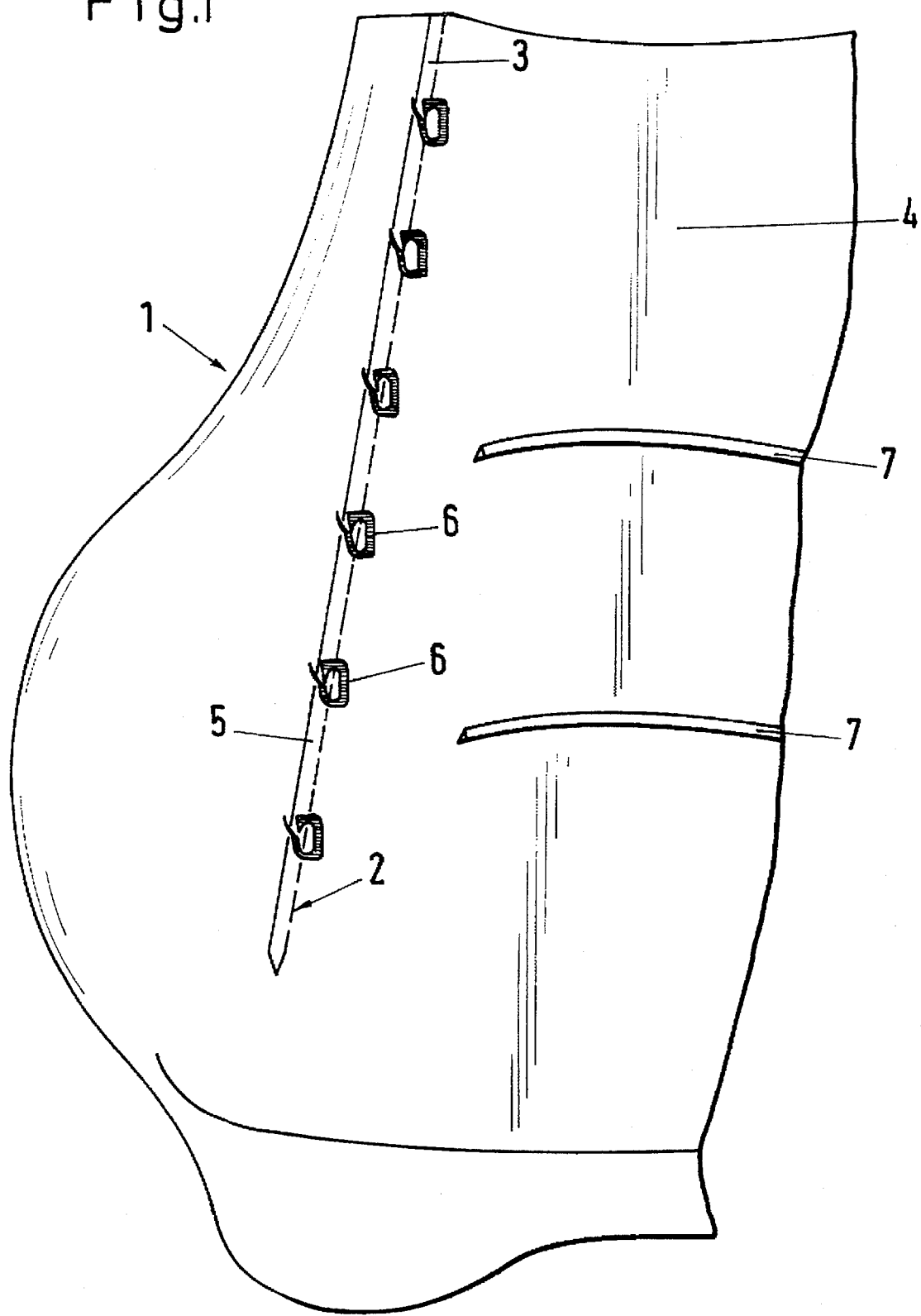

FIG. 1 shows a view of one half of an upholstered part, such as a seat part 1 as part of an automobile seat. An anchoring strip which, as a whole, is labeled 2, is shown in an insertion gap 3 in the upholstery material 4 of the seat part 1. The anchoring strip has the desired course, corresponding to the desired course of the blind seam that is to be produced in the seat part 1. The anchoring strip 2 consists of a molded object, which is formed in one piece from a suitable thermoplastic material, such as polypropylene. The anchoring strip 2 has a basic connector bar 5, which is flexible perpendicular to its main plane and along the longitudinal extent of which individual receiving elements 6 are provided, which are spaced apart from one another. The basic connector bar 5 enables the anchoring strip 2 to be bent in a direction perpendicular to the main plane of the basic connector bar 5, that is, upward or downward, in order to achieve the desired course in the upholstery material 4 for the confirmation shown and contours similar to those shown, for example at 7, strictly diagrammatically for a profile shaping running transversely over the seat part 1.

Figure 2:
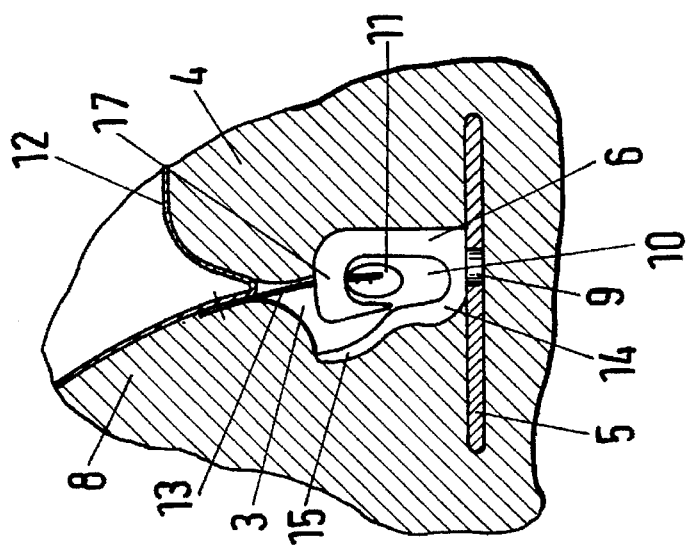
Figure 3:
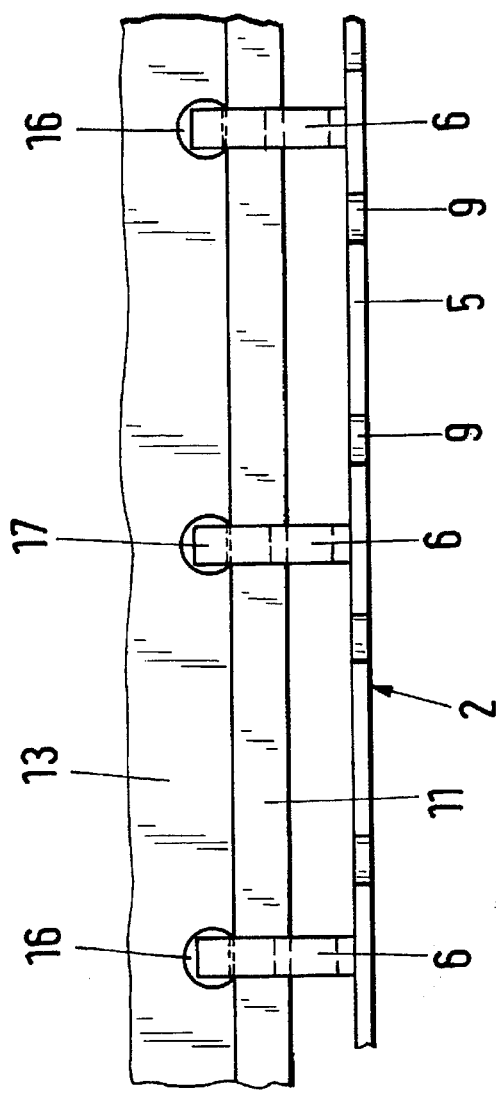

As can be inferred particularly from FIGS. 2 and 3, the basic connector bar 5 has the shape of a flat profile, which is directed transversely to the longitudinal extent of the receiving elements 6, which in turn point to the outside 8 of the upholstery material 4. The upholstery material 4 consists of a suitable foam material, such as a polyurethane foam, with which the basic connector bar 5 of the anchoring strip 2 is foamed during the production of the seat part 1 in an appropriate foaming mold. To improve the anchoring engagement, so produced, of the basic connector rod 5 with the upholstery material 4, passage holes 9, into which the foam material 4 penetrates during the foaming, can be provided in the basic connector bar 5 at suitable distances from the receiving elements 6.

The receiving elements 6 have the basic conformation of a C profile, which forms an accommodating space 10 for a pull-in rod 11, which in turn consists of a thermoplastic material, for example of polypropylene like the anchoring strip 2, and carries along a longitudinal edge a sewing-on flag 13, which is to be sewn together with the covering material 12. The sewing-on flag 13 consists of a nonwoven fabric, scrim fabric or similar textile material, which is firmly welded between two legs of the pull-in rod 11.

The open side of the side C profile of the receiving elements 6 is essentially closed off by a profiled leg 14, which is molded to the C profile in one piece and can be bent elastically to the outside. In this way, it forms a spring hook, into which the pull-in rod 11 is pressed from the outside with its longitudinal edge opposite the sewing-on flag 13 through the material gap 3, in order to reach the accommodating space 10, the cross section of which is adapted to the pull-in rod 11, particularly to the upper region of said rod 11. As the pull-in rod 11 is being pressed in, the profiled leg 14 deforms elastically to the outside, in order to spring back subsequently into its initial position, which can be seen particularly in FIG. 3.

To facilitate the insertion motion of the pull-in rod 11 with the covering material 12 sewn on over the sewing-on flag 13, the profile leg 14 has a leg projection 15, which is directed to the outside 8 of the seat part or the foam material 4 and diverges away from the C profile and forms with said C profile an entrance mouth for the pull-in rod 11.

For the locking engagement of the pull-in rod 11 in the receiving elements 6 in the manner shown, the sewing-on flag 13 is provided opposite each engagement region of the pull-in rod 11 with a receiving element 6 with a pass-through opening 16 for the adjoining upper profiled leg 17 of the receiving element 6.

The V-shaped, pulled-in region of the covering material 12 can be seen in FIG. 3. It is produced in the state in which the pull-in rod 11 is locked together with the receiving elements 6. Adjoining this region on both sides are the desired archings for the seat part 1 as part of the automobile seat. The inner side of the profiled leg 17 forms an abutment or stop surface within the accommodating space 10 for the correspondingly contoured pull-in rod 11, so that this rod 11 is held securely in the receiving elements 6 and the covering material 12 at the same time is fixed over the sewing-on flag 13 in the inwardly pulled-in position.

I claim:

1. An upholstered product comprising a foam upholstery material covered on the outside by a covering material, a one-piece molded plastic anchoring means, said anchoring means including an elongated flexible connector bar and spaced receiving means disposed along the longitudinal extent of said connector bar, said connector bar being anchored to said foam upholstery material, a pull-in rod, said pull-in rod having a sewing-on flag for the covering material, said sewing-on flag having a pass-through opening means associated with each receiving means so that a part of said receiving means can be pass through said opening means, said receiving means being operable to receive and secure said pull-in rod to said anchoring means to thereby provide a firm holding engagement between said pull-in rod and said anchoring means, said receiving means comprising a receiving element having a generally C-shaped portion, said C-shaped portion having an open side, said receiving means having a leg portion integrally molded with said C-shaped portion, said leg portion comprising an elastic material sufficient to enable said leg portion to be elastically flexed from a closed position to an open position, said leg portion when in said closed position being disposed juxtaposed to said open side of said C-shaped portion, said leg portion when in said open position being spaced from said open side of said C-shaped portion.

2. An upholstered product according to claim 1 wherein said C-shaped portion of said receiving means has an interior defining an accommodating space in which said pull-in rod is received.

3. An upholstered product according to claim 1 wherein said leg portion when in said closed position substantially closes said open side.

4. An upholstered product according to claim 1 wherein the interior of the C of said C-shaped portion defines an accommodating space for said pull-in rod, said leg portion when in said open position permitting said pull-in rod to be passed through said open space into said accommodating space.

5. An upholstered product according to claim 4 wherein said C-shaped portion has an upper part in which said pull-in rod is retained, said C-shaped portion having a lower part which is integrally molded to said connector bar, said leg portion having an extension which diverges away from said upper part of said C-shaped portion such that said extension is spaced from said upper part of said C-shaped portion, the space between said extension and said upper part of said C-shaped portion defining an entrance mouth for said pull-in rod when said pull-in rod is to be disposed in said accommodating space in said C-shaped portion.

6. An upholstered unit comprising foam upholstery material, a covering material covering the outside of said foam upholstery material, a pull-in rod connected to said covering material for shaping the profile of said foam upholstery material, a plastic molded anchoring means including an elongated flexible connector bar and spaced receiving means disposed along the elongated extent of said connector bar, said connector bar having a generally flat cross sectional configuration, said connector bar being provided with through passages, said foam upholstery material penetrating through said passages during foaming of said foam upholstery material, said connector bar being anchored to said foam upholstery material, said receiving means being operable to receive and secure said pull-in rod to said anchoring means to thereby provide a firm holding engagement between said pull-on rod and said anchoring means.

7. An upholstered unit comprising foam upholstery material, a covering material covering the outside of said foam upholstery material, a pull-in rod connected to said covering material for shaping the profile of said foam upholstery material, a molded plastic anchoring means including an elongated flexible connector bar and spaced receiving means disposed along the elongated extent of said connector bar, said connector bar being anchored to said foam upholstery material, said receiving means being operable to receive and secure said pull-in rod to said anchoring means to thereby provide a firm holding engagement between said pull-in rod and said anchoring means, said receiving means comprising a receiving element having a generally C-shaped portion, said C-shaped portion having a open side, said receiving means having a leg portion integrally molded with said C-shaped portion, said leg portion comprising an elastic material sufficient to enable said leg portion to be elastically flexed from a closed position to an open position, said leg portion when in said closed position being disposed juxtaposed to said open side of said C-shaped portion, said leg portion when in said open position being spaced from said open side of said C-shaped portion.

8. An anchoring device anchored to a foam upholstery material and a pull-in rod connected to a covering material for shaping the profile of the foamed upholstery material which is covered on the outside by said covering material, the combination comprising a molded plastic anchoring means which includes an elongated flexible connector bar and spaced receiving means disposed along the elongated extent of said connector bar, said connector bar having a generally flat cross sectional configuration, said connector bar being provided with through passages, said foam upholstery material penetrating through said passages during forming of said foam upholstery material, said connector bar being anchored to said foam upholstery material, said receiving means being operable to receive and secure said pull-in rod to said anchoring means to thereby provide a firm holding engagement between said pull-in rod and said anchoring means.

9. An anchoring device according to claim 8 wherein said receiving means have a generally C-shaped configuration with the interior of the C defining an accommodating space in which said pull-in rod is received.

10. An anchoring device adapted to be anchored to a foam upholstery material and a pull-in rod adapted to be connected to a covering material for shaping the profile of the foam upholstery material which is covered on the outside by said covering material, the combination comprising a molded plastic anchoring means which includes an elongated flexible connector bar and spaced receiving means disposed along the elongated extent of said connector bar, said receiving means being operable to receive and secure said pull-in rod to said anchoring means to thereby provide a firm holding engagement between said pull-in rod and said anchoring means, said receiving means comprising a receiving element having a generally C-shaped portion, said C-shaped portion having a open side, said receiving means having a leg portion integrally molded with said C-shaped portion, said leg portion comprising an elastic material sufficient to enable said leg portion to be elastically flexed from a closed position to an open position, said leg portion when in said closed position being disposed juxtaposed to said open side of said C-shaped portion, said leg portion when in said open position being spaced from said open side of said C-shaped portion.

11. An anchoring device according to claim 10 wherein said leg portion when in said closed position substantially closes said open side.

12. An anchoring device according to claim 10 wherein the interior of the C of said C-shaped portion defines an accommodating space for said pull-in rod, said leg portion when in said open position permitting said pull-in rod to be passed through said open space into said accommodating space.

13. An anchoring device according to claim 12, wherein said C-shaped portion has an upper part in which said pull-in rod is retained, said C-shaped portion having a lower part, said leg portion having an extension which diverges away from said upper part of said C-shaped portion such that said extension is spaced from said upper part of said C-shaped portion, the space between said extension and said upper part of said C-shaped portion defining an entrance mouth for said pull-in rod when the pull-in rod is to be disposed in said accommodating space in said C-shaped portion.

* * * * *